United States Patent [19]

Cassel

[11] 4,056,273
[45] Nov. 1, 1977

[54] COUPLING FOR PIPE LAP JOINTS

[76] Inventor: Thomas R. Cassel, 226 Shirley, Birmingham, Mich. 48009

[21] Appl. No.: 748,423

[22] Filed: Dec. 8, 1976

[51] Int. Cl.² .............................................. F16L 21/06
[52] U.S. Cl. .................................... 285/337; 285/382; 285/420
[58] Field of Search .............. 285/373, 419, 418, 417, 285/382, 369, 420, 337; 24/279, 280

[56] References Cited

U.S. PATENT DOCUMENTS

| | | | |
|---|---|---|---|
| 1,302,944 | 5/1919 | Maclaren | 285/419 |
| 1,586,668 | 6/1926 | Garner | 285/373 X |
| 2,227,551 | 1/1941 | Morris | 285/373 |
| 2,456,048 | 12/1948 | Carpenter | 285/417 X |
| 3,801,141 | 4/1974 | Hollingsworth | 285/373 X |
| 3,905,623 | 9/1975 | Cassel | 285/382 |
| 3,944,265 | 3/1976 | Hiemstra et al. | 285/419 |

Primary Examiner—Thomas F. Callaghan
Attorney, Agent, or Firm—Reising, Ethington, Barnard, Perry & Brooks

[57] ABSTRACT

A coupling of the disclosure connects and seals inner and outer pipes having an interfitted lap joint by the provision of a coupling band that is stretched about the joint in a clamping relationship over the outer pipe end and a seal ring engaged with the inner pipe. A roundish sleeve portion of the band is stretched by deformation of a radially projecting channel portion thereof which receives a pair of axially spaced reaction members in respective axial alignment with the seal ring and the outer pipe end. A clamping device of the coupling includes tightening members on opposite sides of the band channel portion and cooperable nut and bolt sets that move the tightening members toward each other to deform the band channel portion against the reaction members and thereby stretch the sleeve portion over the joint. A strip of sealing material is bonded to each reaction member and engaged with the outer pipe end and the seal ring. Circumferential ends of the seal ring have respective ramp surfaces interengaged with each other at an angularly spaced location from the band channel portion. During the deformation of the band channel portion, the seal ring ends are moved axially relative to each other to maintain a sealed condition between the ring ends.

10 Claims, 6 Drawing Figures

COUPLING FOR PIPE LAP JOINTS

BACKGROUND OF THE INVENTION

1. Field of the Invention

This invention relates to pipe couplings of the type wherein a coupling member band is stretched over a pipe joint to provide connection of the pipes in a sealed relationship. The pipe coupling of this invention is an improvement of my pipe coupling disclosed and claimed in U.S. Pat. No. 3,905,623, the entire disclosure of which is hereby incorporated by reference.

Pipe couplings for connecting pipes and sealing therebetween at a joint have many uses. One principal use for such couplings is for joining two pipes of a vehicle exhaust system. A relatively high mechanical strength is required for such couplings together with a fluid tight seal and ease of installation and removal. Due to the high temperatures at which these exhaust systems operate, the pipes and the coupling members are generally fabricated from steel so as to have the requisite strength during use for many years of service. When utilized with heavy duty truck exhaust systems, the couplings must be able to join relatively large diameter pipes which sometimes take the form of flexible metal hoses. Likewise, the pipes sometimes take the form of pipe stubs projecting from a muffler of the exhaust system for connection to an adjacent exhaust or tail pipe.

Other fluid pipes such as relatively small diameter metal or plastic water pipes, and relatively large diameter drainage and sewage tile pipes of either plastic or clay materials, etc., may likewise utilize couplings of the type to which the invention relates.

2. Description of the Prior Art

My aforementioned U.S. Pat. No. 3,905,623 discloses different types of pipe couplings in which a band sleeve portion is stretched over a pipe joint to provide a mechanical connection with a sealed condition between the pipes. One type of the coupling therein disclosed interconnects pipes of the same diameter and size at a butt joint where ends of the pipes butt against each other at axially engaged end surfaces. Another type of the coupling disclosed in this patent is used with a lap joint where an inner pipe end is received within a specially formed outer pipe end. Both types of the couplings stretch a sleeve portion thereof over the pipe joint to provide the mechanical interconnection and sealed condition of the coupling. However, in certain instances, the mechanical strength with the butt type joint is not great enough and the cost for specially forming the outer pipe end and to provide the lap type joint coupling is prohibitive even though the interfitted relationship of the pipes provides the requisite mechanical strength. Both types of the coupling have a channel portion connected to the sleeve portion that is stretched over the joint. The combined circumferential length of the sleeve portion and the channel portion is slightly less than the pipe structure received therein so that deformation of the channel portion permits stretching of the sleeve portion to provide the mechanical connection and the fluid type seal.

SUMMARY OF THE INVENTION

An object of the present invention is to provide a high strength coupling for connecting and sealing inner and outer pipes at a lap joint of the pipe ends without the necessity of specially forming either pipe end.

In carrying out the above object, the pipe coupling includes a band having a generally round sleeve portion extending about the interfitted pipe ends and a radially projecting channel portion connected to the sleeve portion and cooperating therewith in completely encircling the pipe ends while extending axially from the outer pipe end over the inner pipe. A seal ring is received within the sleeve portion of the band so as to butt axially against the outer pipe end and has inner and outer surfaces that form an axial continuation of the inner and outer surfaces on the outer pipe. First and second axially spaced reaction members are received within the channel portion of the band in respective axial alignment with the outer pipe end and the seal ring. Deformation of the band channel portion against the reaction members by a clamping device stretches the band sleeve portion over the outer pipe end and the seal ring to provide the connection of the pipes in a fluid tight sealed condition.

Opposite circumferential ends of the coupling seal ring are interengaged with each other. At least one of the seal ring ends has a ramp surface that engages the other seal ring end to move the ring ends axially relative to each other during clamping of the ring by the sleeve portion over the inner pipe. Best sealing is achieved when both of the seal ring ends have ramp surfaces that are interengaged. An extreme end surface of each seal ring end preferably extends axially from one end of its ramp surface and a second end surface extends axially from the other end of its ramp surface. The first extreme end surface of each seal ring end is located in an opposed relationship to the second end surface of the opposite seal ring end. Spacing the seal ring ends angularly with respect to the band channel portion provides the most effective sealing of the coupling.

A strip of sealing material is secured to curved inner surfaces of the reaction members within the band channel portion. During securing of the coupling to the pipe joint, the seal strip is compressed between the reaction members and the outer surfaces on the outer pipe end and the seal ring in order to provide sealing. Asbestos is preferably utilized as the material from which the seal strip is made when the coupling is utilized at high temperatures such as those present with vehicle exhaust system pipe joints.

In its most preferred form, the coupling band has opposite ends welded to each other to form a base of the band channel portion. Sides of the band channel portion extend from the base to the sleeve portion which is stretched about the pipe joint by the clamping device. Each reaction member has an enlarged outer end engaged with the channel portion base and an enlarged inner portion at which the curved inner surface bonded to the seal strip is defined. Between the inner and outer ends of each reaction member, an intermediate portion of the reaction member has oppositely disposed curved surface portions that face toward the opposite sides of the channel portion. Tightening members of the clamping device are positioned adjacent each channel portion side and have curved surfaces that face the curved surface portions on the intermediate portions of the reaction members. Bolts of a pair of nut and bolt sets extend through aligned holes in the tightening members, the channel portion sides, and the reaction members so that the channel portion sides are deformed and clamped against the reaction members to stretch the sleeve portion over the joint as the tightening members are drawn toward each other by threading of the nuts along the bolts.

Each component of the pipe coupling except for the seal strip is made from a metallic material when the coupling is utilized with a vehicle exhaust system joint. Both the pipes will than also be made from a metallic material with either a solid or flexible type construction.

The objects, features and advantages of the present invention are radially apparent from the following detailed description of the preferred embodiment taken in connection with the accompanying drawings.

DETAILED DESCRIPTION OF THE PREFERRED EMBODIMENT

Figure 1:
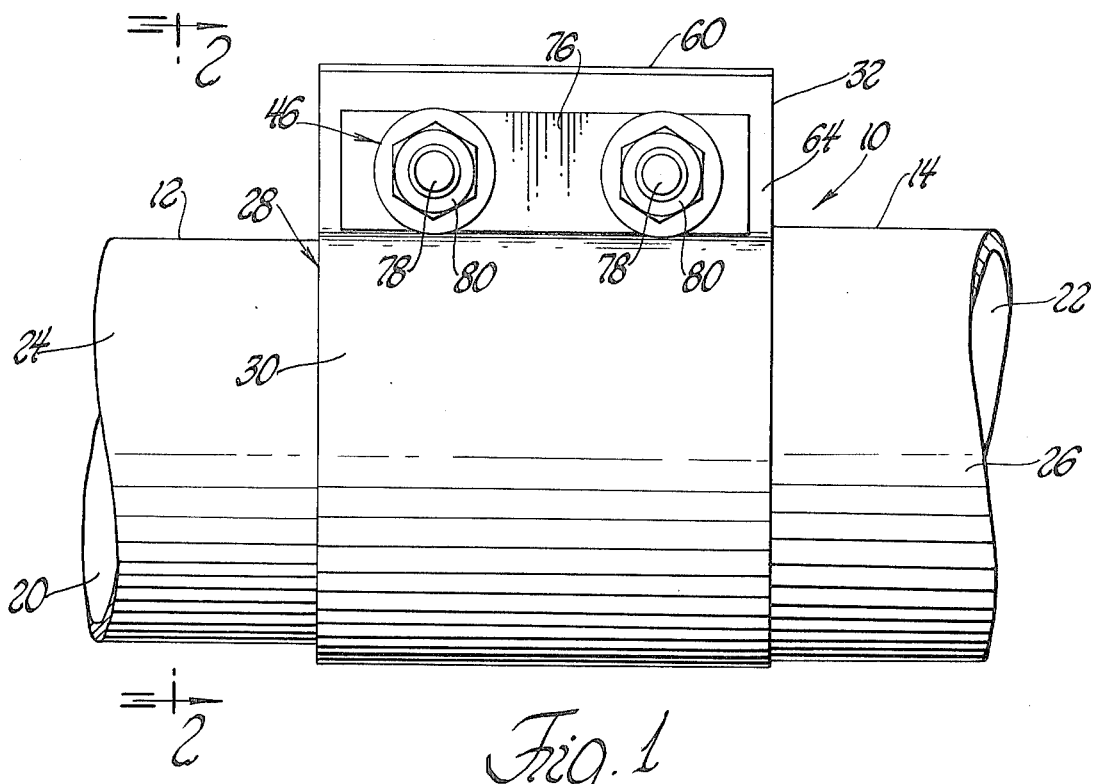
FIG. 1 is a side elevation view of a pipe lap joint coupling constructed according to the present invention.
Figure 4:
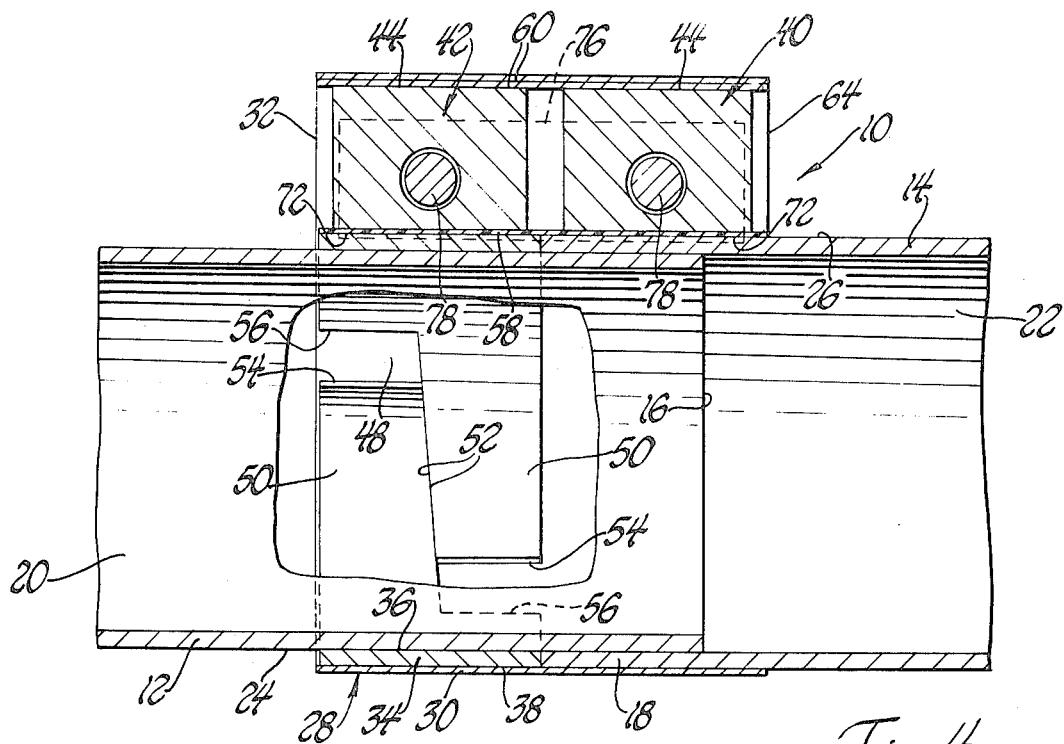
FIG. 4 is a sectional view through the coupling and pipe joint taken along line 4—4 of FIG. 3.

With reference to FIG. 1, a preferred embodiment of a pipe coupling constructed according to the present invention is indicated generally by 10 and functions to mechanically connect and seal a lap joint between inner and outer pipes 12 and 14. Each pipe 12 and 14 has a round cross section and, as seen in FIG. 4, and end 16 of the inner pipe is received within an end 18 of the outer pipe at the pipe joint in a telescoped relationship. Pipes 12 and 14 have respective round inner surfaces 20 and 22 as well as respective round outer surfaces 24 and 26. Coupling 10 clamps the outer surface 26 of outer pipe 14, in a manner that is hereinafter described in detail, so that the inner surface 22 of the outer pipe is clamped onto the outer surface 24 of the inner pipe in a manner that provides a high strength mechanical connection in a fluid type sealed relationship.

Figure 2:
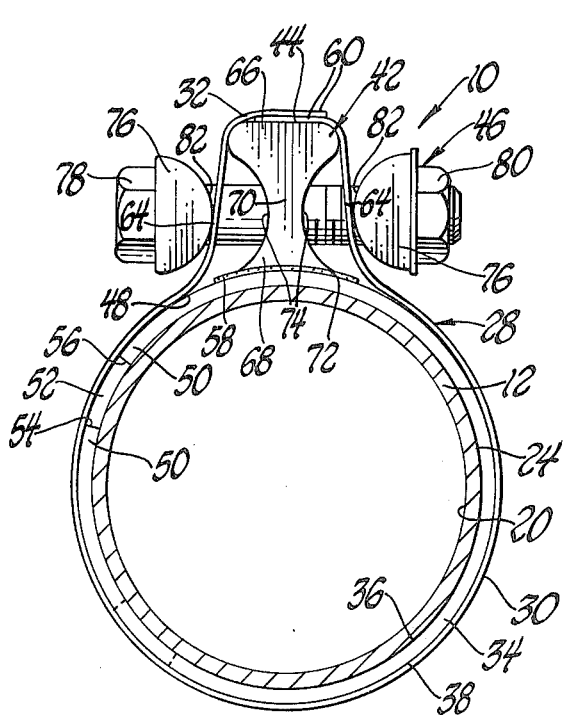
FIG. 2 is an end view of the coupling taken along line 2—2 of FIG. 1 before mechanical securement and sealing of the coupling to the pipe joint.

As seen by combined reference to FIGS. 1 and 2, the coupling 10 includes a metallic coupling band 28 having a roundish sleeve portion 30 that extends about the pipe joint and a radially projecting channel portion 32 which cooperates with the sleeve portion in encircling the pipe ends. As seen in FIG. 4, both the sleeve and channel portions 30 and 32 of band 28 extend axially from the outer pipe end 18 over the inner pipe 12. A metallic seal ring 34 of a round shape is received within the band sleeve portion 30 and butts axially against the outer pipe end 18 so that inner and outer surfaces 36 and 38 of the ring form axial continuations of the inner and outer surfaces 22 and 26 of the outer pipe. First and second metallic reaction members 40 and 42 are received within the band channel portion 32 spaced axially relative to each other in respective alignment with the outer pipe end 18 and the seal ring 34. Reaction members 40 and 42 have outer surfaces 44 that respectively provide circumferential continuations of the outer surface 26 on pipe end 18 and the outer surface 38 on seal ring 34.

Figure 3:
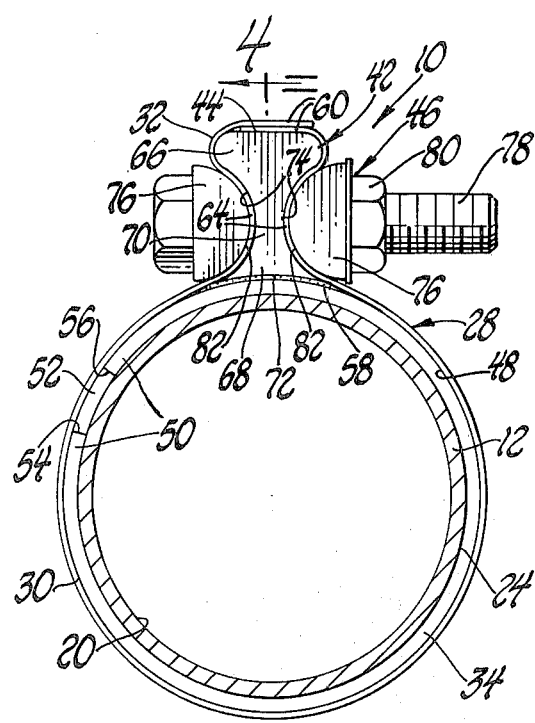
FIG. 3 is a view taken in the same direction as FIG. 2 but after the coupling has been secured and sealed at the pipe joint.

A clamping device 46 shown in FIG. 2 is utilized to deform the band channel portion 32 over the reaction members 40 and 42 in order to stretch the band sleeve portion over the pipe joint. For this stretching to take place, the combined circumferential length of the inner band surface 48 over the band sleeve portion 30 and channel portion 32 must be just slightly less than the combined circumferential length of the outer surface 26 on pipe end 18 and the outer surface 44 of the first reaction member 40. Likewise, the combined circumferential length of the inner band surface 48 over the band sleeve portion 30 and channel portion 32 must be just slightly less than the combined circumferential length of the outer surface 44 on reaction member 42 (FIG. 3) and the outer surface 38 of the seal ring 34 with the inner surface 36 of the seal ring engaged with the outer surface 24 of inner pipe 12. When these conditions are met, the deformation of band channel portion 32 from the condition of FIG. 2 to the condition of FIG. 3 by operation of the clamping device 46 causes the stretching of the band sleeve portion 30 over the pipe joint to provide the high strength mechanical connection that seals the pipes.

Figure 6:
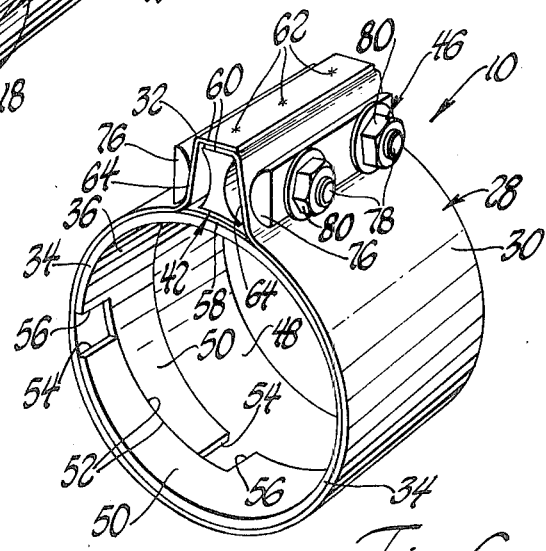
FIG. 6 is a perspective view of the coupling.

As best seen in FIG. 6, seal ring 34 has a split construction including opposite circumferential ends 50 having respective ramp surfaces 52 slidably interengaged with each other. A first extreme end surface 54 at one end of each ramp surface 52 extends in an axial direction and is located in a spaced relationship opposing a second axially extending surface 56 at the other end of the ramp surface on the opposite seal ring end. Seal ring 34 in a free condition has an inner surface diameter that is just slightly greater than the outer surface 24 of the inner pipe 12 so that the coupling 10 can be slid over the innner pipe 12 during assembly prior to the outer pipe end 18 being slid over the inner pipe end 16 within the coupling sleeve portion 30. Subsequent tightening of the clamping device 46 to stretch the sleeve portion 30 then elastically deforms the seal ring 34 to decrease its diameter as the ring end ramp surfaces 52 slide with respect to each other to move the ring ends 50 axially in opposite directions relative to each other. This axial movement of the seal ring ends 50 increases the force that engages the surfaces 52 with each other so as to ensure sealing between the ring ends. Also, it should be noted that the seal ring ends 50 are located in an angularly spaced relationship with respect to the band channel portion 32 in order to decrease the possibility of leakage with the coupling securing the pipes. Within the band channel portion 32, a seal strip 58 of asbestos or other sealing material is adhesively bonded to the reaction members 40 and 42 and engaged with the outer surfaces 26 and 38 on pipe end 18 and seal ring 34 in order to ensure the sealed condition between the pipes by being compressed during the clamping.

Figure 5:
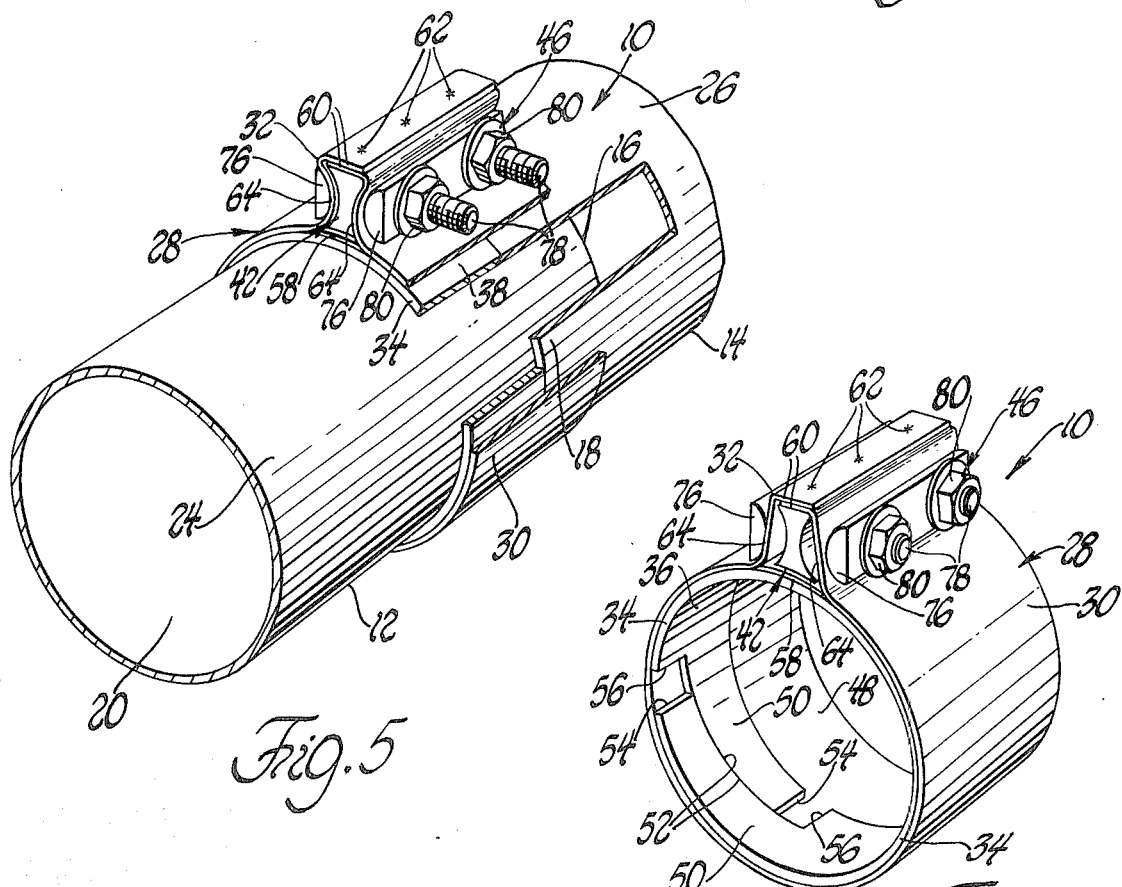
FIG. 5 is a partially broken away perspective view of the coupling and pipe joint.

As seen in FIGS. 5 and 6, the coupling band 28 has overlapping ends 60 secured to each other by spot welds 62 and forming a base of the band channel portion 32. Opposite sides 64 of the band channel portion extend from the end 60 on opposite sides of the reaction members in a spaced relationship thereto prior to securement of the coupling. Each reaction member, as seen in FIG. 2, has an enlarged outer end 66 engaged with the innermost overlapping band end 60 and an enlarged inner end 68 connected with the outer end by a reduced diameter intermediate portion 70. The inner end 68 of each reaction member has a inner curved surface 72 to which the seal strip 58 is adhesively bonded. Oppositely disposed curved surface portions 74 on the intermediate portions 70 of the reaction members face toward the band channel portion sides 64 spaced therefrom prior to securement of the coupling.

Clamping device 46 as seen by reference to FIGS. 1, 2, 5 and 6 includes a pair of tightening members 76 as well as a pair of nut and bolt sets including bolts 78 and nuts 80. Tightening members 76 have curved surfaces 82 complementary to the curved surface portions 74 of the reaction members so as to be capable of cooperating in a clamping relationship. Bolts 78 extend through aligned holes in the tightening members 76, the band channel portion sides 64, and in the reaction members 40 and 42 as shown in FIG. 4 such that threading movement of the nuts 80 along the bolts from the position of FIG. 2 to the position of FIG. 3 moves the tightening members 76 toward each other to deform the channel portion sides of the band. This deformation of the band channel portion clamps the deformed sides 64 between the tightening member 76 and the reaction members and stretches the band sleeve portion 30 about the pipe joint as previously described.

Coupling 10 can be loosened by unthreading the nuts of the clamping device 46 to permit separation of the inner and outer pipes 12 and 14. This loosening of the coupling allows the seal ring 34 to radially expand a slight extent as the band sleeve portion 30 simultaneously expands to permit the pipe separation.

Coupling 10 is particularly adaptable for use in connecting pipes of a vehicle exhaust system. When used in this environment, each of the coupling components except for the asbestos seal strip 58 is made from a suitable metallic material as are the pipes interconnected by the coupling. While the pipes shown are made of a solid construction, it is also possible for the coupling to be utilized with flexible pipe constructions. In exhaust systems, the same size pipes are conventionally used in providing lap joints. One of the pipe ends is expanded while maintaining its roundness so as to receive the other pipe. Manufacturing tolerances of pipe thickness and diameter are accommodated for with coupling 10 by the provision of the two axially spaced reaction members 40 and 42. Each reaction member can move independently of the other during clamping as a result of a slight amount of slop between the bolts 78 and the holes through the reaction members as shown in FIG. 4. Such independent movement of the reaction members accommodates for the manufacturing tolerances mentioned as well as for manufacturing tolerances in the thickness of seal ring 34 between its inner and outer surfaces. No special forming of either the inner pipe or the expanded outer pipe is required to clamp the coupling over the joint and provide mechanical connection and fluid sealing even with the conventional manufacturing tolerances involved.

While a preferred embodiment of a pipe coupling has herein been described in detail, those familiar with the pipe coupling art will recognize various alternative designs and embodiments for practicing the present invention as defined by the following claims.

What is claimed is:

1. A coupling for connecting and sealing inner and outer pipes having respective inner and outer surfaces and ends that lap each other at a joint where the inner pipe is received within the outer pipe in a telescoped relationship, the coupling comprising: a coupling band having a roundish sleeve portion extending about the pipe ends and a radially projecting channel portion connected to the sleeve portion and cooperating therewith in encircling the pipe ends while extending axially from the outer pipe end over the inner pipe; a seal ring received within the sleeve portion of the band so as to be adaptable to butt against the outer pipe end and having inner and outer surfaces for forming an axial continuation of the inner and outer surfaces on the outer pipe; first and second axially spaced reaction members received within the channel portion of the band in respective axial alignment with the outer pipe end and the seal ring; said reaction members having outer surfaces that respectively form circumferential continuations of the outer surfaces on the outer pipe end and the seal ring in a spaced relationship to the band channel portion; said band having an inner surface whose combined circumferential length about the sleeve and channel portions thereof is less than the combined circumferential length of the outer surface on the outer pipe end and the outer surface on the first reaction member; the combined circumferential length of the inner surface of the band about the sleeve and channel portions thereof also being less than the combined circumferential length of the ring outer surface and the outer surface on the second reaction member when the ring has the inner surface thereof engaged with the outer surface on the inner pipe; and force applying means for engaging the inner surface of the band at the channel portion thereof with the outer surface of the reaction members to stretch the band sleeve portion over the seal ring and the end of the outer pipe and provide a clamped relationship thereof that connects and seals the pipes.

2. A coupling as in claim 1 wherein the seal ring includes opposite circumferential ends interengaged with each other; and at least one of the seal ring ends having a ramp surface that engages the other seal ring end to move the ring ends axially relative to each other during clamping of the ring over the inner pipe and thereby provide sealing of the ring between the ring ends.

3. A coupling as in claim 2 wherein both seal ring ends have ramp surfaces interengaged with each other.

4. A coupling as in claim 3 wherein each seal ring end has a first extreme end surface extending axially from one end of the ramp surface thereof and a second end surface extending axially from the other end of the ramp surface thereof in an opposed relationship to the first end surface on the other ring end.

5. A coupling as in claim 1 further including a strip of seal material secured to the reaction members and engaged with the outer surfaces of the seal ring and the outer pipe end within the channel portion of the band.

6. A coupling as in claim 1 wherein the band includes opposite circumferential ends overlapping each other and welded to each other to form a base of the channel portion, the band including channel portion sides that connect the channel portion base with the sleeve portion that extends about the pipe ends, the force applying means including a clamping device having a pair of tightening members for respectively engaging the band channel portion sides and a pair of nut and bolt sets for moving the tightening members toward each other to deform the band channel portion sides into engagement with the reaction members in order to stretch the band sleeve portion over the outer pipe end and the seal ring.

7. A coupling as in claim 6 wherein each reaction member includes enlarged inner and outer ends and an intermediate portion extending therebetween, the intermediate portion of each reaction member having oppositely oriented curved outer surface portions facing toward the band channel portion sides, the tightening members having curved surfaces for deforming the channel portions sides and clamping the deformed sides against the reaction members, and the tightening and reaction members having holes that receive the bolts of the nut and bolt sets.

8. A coupling as in claim 7 wherein the enlarged inner ends of the reaction members include curved surfaces concentric with the pipes, and a strip of seal material bonded to the curved surfaces of the reaction member inner ends and engaged with the outer surface of the seal ring and the outer surface on the outer pipe end.

9. A coupling for connecting and sealing inner and outer pipes having respective inner and outer surfaces and ends that lap each other at a joint where the inner pipe is received within the outer pipe in a telescoped relationship, the coupling comprising: a metallic coupling band having a roundish sleeve portion extending about the pipe ends and a radially projecting channel portion connected to the sleeve portion and cooperating therewith in encircling the pipe ends while extending axially from the outer pipe end over the inner pipe; a metallic split seal ring received within the sleeve portion of the band so as to be adaptable to butt against the outer pipe end and having inner and outer surfaces for forming an axial continuation of the inner and outer surfaces on the outer pipe; the seal ring including opposite circumferential ends having respective ramp surfaces interengaged with each other and located in an angularly spaced relationship from the band channel portion; first and second axially spaced metallic reaction members received within the channel portion of the band in respective axial alignment with the outer pipe end and the seal ring; said reaction members having outer surfaces that respectively form circumferential continuations of the outer surfaces on the outer pipe end and the seal ring in a spaced relationship to the band channel portion; said band having an inner surface whose combined circumferential length about the sleeve and channel portion thereof is less than the combined circumferential length of the outer surface on the outer pipe end and the outer surface on the first reaction member; the combined circumferential length of the inner band surface about the sleeve and channel portions of the band also being less than the combined circumferential length of the ring outer surface and the outer surface on the second reaction member when the ring has the inner surface thereof engaged with the outer surface on the inner pipe; and force applying means including a clamping device having a pair of metallic tightening members and a pair of nut and bolt sets for engaging the inner surface of the band at the channel portion thereof with the outer surface of the reaction members to stretch the band sleeve portion over the seal ring and the end of the outer pipe and provide a clamped relationship thereof that connects and seals the pipes, the ramp surfaces of the seal ring ends moving the seal ring ends axially with respect to each other during the clamping to provide a sealed relationship between the ends.

10. A coupling for connecting and sealing inner and outer pipes having respective inner and outer surfaces and ends that lap each other at a joint where the inner pipe is received within the outer pipe in a telescoped relationship, the coupling comprising: a metallic coupling band having a roundish sleeve portion extending about the pipe ends and a radially projecting channel portion having sides connected to the sleeve portion and overlapping band ends welded to each other to provide a base of the channel portion; said band sleeve and channel portions cooperating to encircle the pipe ends while extending axially from the outer pipe end over the inner pipe; a metallic split seal ring received within the sleeve portion of the band so as to be adaptable to butt against the outer pipe end and having inner and outer surfaces for forming an axial continuation of the inner and outer surfaces on the outer pipe; the seal ring including opposite circumferential ends having respective ramp surfaces interengaged with each other and located in angularly spaced relationship from the band channel portion; first and second axially spaced metallic reaction members received within the channel portion of the band in respective axial alignment with the outer pipe end and the seal ring; each reaction member having an enlarged outer end engaged with the channel portion base and an enlarged inner end as well as an intermediate portion connecting the ends thereof; the reaction members having outer surfaces that respectively form circumferential continuations of the outer surfaces on the outer pipe end and the seal ring; the intermediate portion of each reaction member having a hole therethrough and oppositely disposed curved surface portions facing toward an associate side of the band channel portion in a spaced relationship thereto and the outer enlarged end of each reaction member engaging the base of the band channel portion; a strip of sealing material bonded to the enlarged inner ends of the reaction members and engaged with the outer surfaces of the seal ring and the outer pipe end; said band having an inner surface whose combined circumferential length about the sleeve and channel portion thereof is less than the combined circumferential length of the outer surface on the outer pipe end and the outer surface on the first reaction member; the combined circumferential length of the inner band surface about the sleeve and channel portions of the band also being less than the combined circumferential length of the ring outer surface and the outer surface on the second reaction member when the ring has the inner surface thereof engaged with the outer surface on the inner pipe; and a clamping device including a pair of tightening members having holes therethrough and curved surfaces for respectively engaging the band channel portion sides, the clamping device also including nut and bolt sets whose bolts extend through the holes in the reaction members and the tightening members so as to permit clamping deformation of the channel portion sides against the reaction members to stretch the band sleeve portion over the seal ring and the end of the outer pipe and thereby connect and provide sealing between the pipes, and the ramp surfaces of the seal ring ends moving axially relative to each other during the clamping and thereby maintaining a sealed condition between the ring ends.

* * * * *